[11] 3,601,472

[72] Inventors David C. Gill
White Bear L...,
Michael J. Buzawa, Rochester, N.Y.
[21] Appl. No. 826,216
[22] Filed May 20, 1969
[45] Patented Aug. 24, 1971
[73] Assignee Minnesota Mining and Manufacturing Company
St. Paul, Minn.

[54] OBJECTIVE LENS
4 Claims, 1 Drawing Fig.
[52] U.S. Cl. .................................................. 350/196, 350/204, 350/215, 350/222
[51] Int. Cl. ...................................................... G02b 9/36, G02b 9/62
[50] Field of Search............................ 350/215, 216, 217, 218, 204

References Cited
UNITED STATES PATENTS
| | | | |
|---|---|---|---|
| 2,983,193 | 5/1961 | Schade ........................ | 350/222 |
| 3,391,968 | 7/1968 | Betensky ..................... | 350/204 X |
| 3,428,386 | 2/1969 | Schlegel ...................... | 350/196 X |

Primary Examiner—John K. Corbin
Attorney—Kinney, Alexander, Sell, Steldt & Delahunt ABSTRACT: A microfilm camera/processor having a constant film plane to copy board distance and a plurality of objective lens systems mounted in a precision turret for alternative utilization to vary the magnification or reduction of the camera/processor. Each lens system includes an eight element microphotographic objective lens for providing alternative magnification, depending upon the system selected, in a fixed copy board to film distance of 82 inches.

PATENTED AUG24 1971
3,601,472
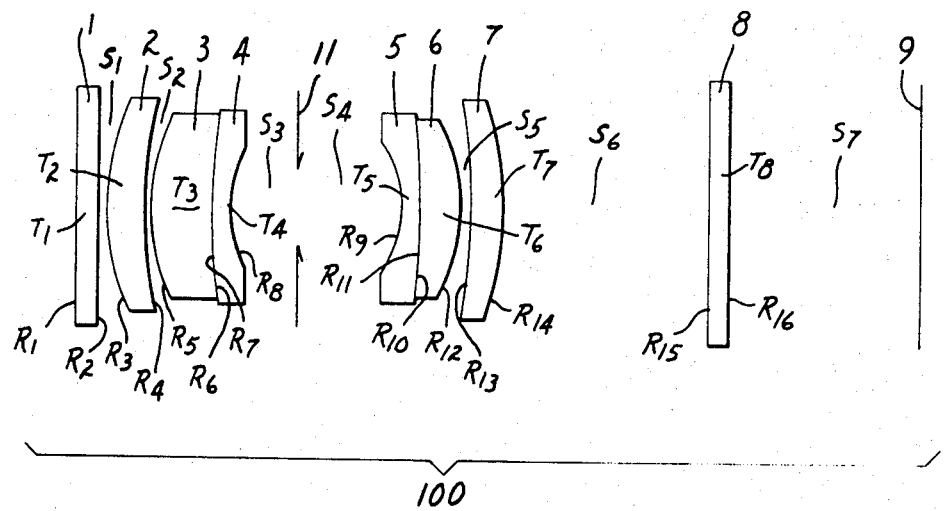
INVENTORS
MICHAEL JOHN BUZAWA
DAVID C. GILKESON
BY Kinney, Alexander,
Sell, Steldt & DeLaHunt
ATTORNEYS 3,601,472

OBJECTIVE LENS

BACKGROUND OF THE INVENTION

There have been different types of microfilm cameras on the market to date, varying from low to high resolution. Generally the highest resolution cameras have been large and expensive planetary cameras affording various reductions by tedious and exact settings by specially trained operating personnel. The other types of microfilm cameras were fixed reduction cameras usually called rotary cameras and were of lower resolution capability. A camera providing the high resolution and variable reduction performance of the planetary cameras while maintaining the ease of operation of the fixed camera would be a significant contribution to the development of the art.

SUMMARY OF THE INVENTION

This invention provides an improved design for an objective lens system, having particular utility in a high resolution fixed microfilm camera/processor. The lens system provides a high resolution, high precision lens design permitting variation in the parameters of the lens elements to provide various focal lengths, relative apertures and image reductions within a fixed copy board to film distance.

It is an object of the present invention to provide an eight-element objective lens system for use with a closed film chamber, having a fixed copy board to film plane distance of 82 inches, to afford selective image reductions for these various focal lengths.

Each microphotographic objective lens includes eight elements numbered consecutively from object toward the image, front to rear, the first element being a filter, the second element being a first positive meniscus lens, the third element being a second positive meniscus lens, the fourth element being a first negative meniscus lens having a convex surface cemented to the concave surface of said second positive meniscus lens, the fifth element being a second negative meniscus lens, the sixth element being a third positive meniscus lens with a concave surface cemented to the convex surface of said second negative meniscus lens, seventh element being a fourth positive meniscus lens, and the eighth element being a spaced transparent glass plate for sealing the film chamber and being an internal part of the optical system.

The drawing comprises a diagrammatic view of a microphotographic objective lens constructed in accordance with the present invention.

Referring to the drawing, the entire eight-element lens system is designated by the reference numeral 100, and the individual elements disclosed in the drawing are numbered from one to eight, consecutively from front to rear, and the reference numeral 9 indicates the image plane for the film. The element 11 refers to the diaphragm or stop which is positioned generally in the center of the lens assembly.

Element 1 is a filter which would be mounted on the front of the lens and spaced a fixed distance from the object plane in the camera arrangement. Air spaced from element 1 is element 2 which is a positive meniscus lens spaced from a negative doublet formed of elements 3 and 4 cemented together at their interface. Element 3 is a positive meniscus and element 4 is a negative meniscus lens and together they define a negative doublet. Diaphragm 11 is spaced from the negative meniscus element 4 and on the other side is a negative doublet formed of elements 5 and 6, 5 being a negative meniscus and 6 being a positive meniscus with its concave face cemented to the convex surface of the negative meniscus. Air spaced from the element 6 is element 7 which is a positive meniscus lens which is air spaced from a glass plate 8 sealing the film chamber of the microfilm camera.

The radii of curvature R of the lens surfaces, the axial thickness T of the lens elements, and the axial air spacings S, are all expressed in the customary manner with the usual numerals indicating the particular surface, lens thickness, or air space, numbered in sequence from front to rear.

The lens system, as shown in the drawing, permits variation in the parameters such as lens thickness, radius of curvature and air spacing to provide various effective focal lengths and image reductions with the same relative aperture of F./6.0 and within a fixed copy board to film distance of 82 inches. For example, focal lengths of 80 mm., 91.2 mm., 115 mm., and the 125 have been derived from the basic teachings and are specifically set forth in tables I, II, III and IV, respectively.

Table I which is an example of the lens having an effective focal length of 80 mm. the relative aperture of F./6.0, can be utilized to produce a 24 X reduction in a fixed copy board to film distance of 82 inches. In table I, as in the following tables, the dimensions are given in millimeters and the plus and minus values of the radii R indicate surfaces respectively convex and concave toward the front. The usual tabular columns provide information concerning the refractive indices N for the D line of sodium, the ABBE dispersive indices V, the radii, lens thickness and air spacings.

TABLE I

E.F. 80 mm.

| Element | $N_D$ | V | Radii mm. | Thickness and Spacing mm. |
|---|---|---|---|---|
| 1. | Schott | GG-395 | $R_1 = \infty$ <br> $R_2 = \infty$ | $T_1 = 4.0 \pm 0.2$ |
| 2. | 1.5891 | 61.24 | $R_3 = +32.80$ <br> $R_4 = +75.78$ | $S_1 = 2.0 \pm 1.0$ <br> $T_2 = 6.0 \pm 0.1$ |
| 3. | 1.6591 | 50.88 | $R_5 = +26.20$ <br> $R_6 = +84.0$ | $S_2 = 0.20 \pm 0.02$ <br> $T_3 = 6.995 \pm 0.07$ |
| 4. | 1.6200 | 36.34 | $R_7 = +84.0$ <br> $R_8 = +16.58$ | $T_4 = 2.50 \pm 0.07$ |
| 5. | 1.6039 | 38.02 | $R_9 = -16.41$ <br> $R_{10} = -741.3$ | $S_3 = 8.55$ <br> $S_4 = 12.836$ <br> $T_5 = 2.00 \pm 0.07$ |
| 6. | 1.6591 | 50.88 | $R_{11} = -741.3$ <br> $R_{12} = -22.85$ | $T_6 = 5.557 \pm 0.070$ |
| 7. | 1.5891 | 61.24 | $R_{13} = -345.4$ <br> $R_{14} = -39.30$ | $S_5 = 0.20 \pm 0.025$ <br> $T_7 = 5.50 \pm 0.10$ |
| 8. | 1.5224 | 59.48 | $R_{15} = \infty$ <br> $R_{16} = \infty$ | $S_6 = 18.057$ <br> $T_8 = 3.81 \pm 0.10$ |

$S_7 = 36.50$ to image plane

Table II is an example of a lens having an effective focal length of 91.2 millimeters, a relative aperture of F./6.0, providing a 21 X reduction in a fixed copy board to film distance of 82 inches.

TABLE II

E.F. 91.2 mm.

| Element | $N_D$ | V | Radii mm. | Thickness and Spacing mm. |
|---|---|---|---|---|
| 1. | Schott | GG-395 | $R_1 = \infty$ <br> $R_2 = \infty$ | $T_1 = 4.0 \pm 0.2$ |
| 2. | 1.5892 | 61.24 | $R_3 = +37.2$ <br> $R_4 = +85.72$ | $S_1 = 2.0 \pm 1.0$ <br> $T_2 = 6.79 \pm 0.10$ |
| 3. | 1.6591 | 50.88 | $R_5 = +29.6$ <br> $R_6 = +95.0$ | $S_2 = 0.230 \pm 0.025$ <br> $T_3 = 7.92 \pm 0.07$ |
| 4. | 1.6200 | 36.34 | $R_7 = +95.0$ <br> $R_8 = +18.75$ | $T_4 = 2.80 \pm 0.07$ |
| 5. | 1.6039 | 38.02 | $R_9 = -18.61$ <br> $R_{10} = -838.2$ | $S_3 = 9.67$ <br> $S_4 = 14.02$ <br> $T_5 = 2.26 \pm 0.07$ |
| 6. | 1.6591 | 50.88 | $R_{11} = -838.2$ | $T_6 = 6.29 \pm 0.07$ |

TABLE II—Continued

| | | | R 25.9 | |
|---|---|---|---|---|
| 7 | 1.5892 | 61.24 | $R_{13}=-393.55$ | $S_6=0.230\pm0.025$ |
| | | | $R_{14}=-44.5$ | $T_7=6.20\pm0.10$ |
| 8 | 1.5224 | 59.48 | $R_{15}=\infty$ | $S_7=26.49$ |
| | | | $R_{16}=\infty$ | $T_8=3.81\pm0.10$ |
| | | | | $S_7=36.5$ to image plane |

Table III is an example of a lens having an effective focal length of 115 millimeters, a relative aperture of F./6.0, providing a 16 X reduction in a fixed copy board to film distance of 82 inches.

TABLE III

E.F. 115 mm.

| Element | $N_D$ | V | Radii mm. | Thickness and Spacing mm. |
|---|---|---|---|---|
| 1. | Schott | GG-395 | $R_1=\infty$ | $T_1=4.0\pm0.2$ |
| | | | $R_2=\infty$ | |
| 2. | 1.5891 | 61.24 | $R_3=+45.66$ | $S_1=2.0\pm1.0$ |
| | | | $R_4=+103.10$ | $T_2=5.500\pm0.10$ |
| 3. | 1.6591 | 50.88 | $R_5=+39.85$ | $S_2=0.20\pm0.025$ |
| | | | $R_6=+140.0$ | $T_3=11.325\pm0.07$ |
| 4. | 1.6200 | 36.34 | $R_7=+140.0$ | $T_4=3.600\pm0.07$ |
| | | | $R_8=+24.87$ | |
| | | | | $S_3=12.07$ |
| | | | | $S_4=18.757$ |
| 5. | 1.6039 | 38.02 | $R_9=-21.90$ | $T_5=2.800\pm0.07$ |
| | | | $R_{10}=-256.2$ | |
| 6. | 1.6591 | 50.88 | $R_{11}=-256.2$ | $T_6=7.553\pm0.07$ |
| | | | $R_{12}=-30.90$ | |
| | | | | $S_5=0.20\pm0.025$ |
| 7. | 1.5891 | 61.24 | $R_{13}=-370.0$ | $T_7=6.500\pm0.10$ |
| | | | $R_{14}=-53.60$ | |
| | | | | $S_6=47.27$ |
| 8. | 1.5224 | 59.48 | $R_{15}=\infty$ | $T_8=3.81\pm0.1$ |
| | | | $R_{16}=\infty$ | |
| | | | | $S_7=36.5$ to image plane |

Table IV is an example of a lens having an effective focal length of 125 millimeters, a relative aperture of F./6.0, providing a 14.8 X reduction in a fixed copy board to film distance of 82 inches.

TABLE IV

E.F. 125 mm.

| Element | $N_D$ | V | Radii mm. | Thickness and Spacing mm. |
|---|---|---|---|---|
| 1. | Schott | GG-395 | $R_1=\infty$ | $T_1=4.0\pm0.2$ |
| | | | $R_2=\infty$ | |
| 2. | 1.5892 | 61.24 | $R_3=+48.83$ | $S_1=2.0\pm1.0$ |
| | | | $R_4=+110.60$ | $T_2=5.90\pm0.10$ |
| 3. | 1.6591 | 50.88 | $R_5=+42.75$ | $S_2=0.215\pm0.025$ |
| | | | $R_6=+150.50$ | $T_3=12.15\pm0.07$ |
| 4. | 1.6200 | 36.34 | $R_7=+150.50$ | $T_4=3.86\pm0.07$ |
| | | | $R_8=+26.70$ | |
| | | | | $S_3=12.95$ |
| | | | | $S_4=20.13$ |
| 5. | 1.6039 | 38.02 | $R_9=-23.50$ | $T_5=3.0\pm0.07$ |
| | | | $R_{10}=-275.0$ | |
| 6. | 1.6591 | 50.88 | $R_{11}=-275.0$ | $T_6=8.10\pm0.07$ |
| | | | $R_{12}=-33.18$ | |
| | | | | $S_5=0.215\pm0.025$ |
| 7. | 1.5892 | 61.24 | $R_{13}=-398.0$ | $T_7=6.97\pm0.10$ |
| | | | $R_{14}=-57.54$ | |
| | | | | $S_6=54.11$ |
| 8. | 1.5224 | 59.48 | $R_{15}=\infty$ | $T_8=3.81\pm0.1$ |
| | | | $R_{16}=\infty$ | |
| | | | | $S_7=36.5$ to image plane |

We claim:

1. A microphotographic objective lens for providing reduced microfilm images and comprising eight elements numbered consecutively from object toward the image, front to rear, the first element being a filter, the second element being a first positive meniscus lens, the third element being a second positive meniscus lens, the fourth element being a first negative meniscus lens having a convex surface cemented to the concave surface of said second positive meniscus lens, the fifth element being a second negative meniscus lens, the sixth element being a third positive meniscus lens with a concave surface cemented to the convex surface of said second negative meniscus lens, the seventh element being a fourth positive meniscus lens, and the eighth element being a spaced transparent glass plate, the glass plate being an integral part of the optical system, said lens system having a relative aperture of F./6.0, and wherein the characteristics of said eight elements and their spatial relationship to each other are substantially in the proportions described in the following table:

TABLE I

E.F. 80 mm.

| Element | $N_D$ | V | Radii mm. | Thickness and Spacing mm. |
|---|---|---|---|---|
| 1. | Schott | GG-395 | $R_1=\infty$ | $T_1=4.0\pm0.2$ |
| | | | $R_2=\infty$ | |
| 2. | 1.5891 | 61.24 | $R_3=+32.80$ | $S_1=2.0\pm1.0$ |
| | | | $R_4=+75.78$ | $T_2=6.0\pm0.1$ |
| 3. | 1.6591 | 50.88 | $R_5=+26.20$ | $S_2=0.20\pm0.02$ |
| | | | $R_6=+84.0$ | $T_3=6.995\pm0.07$ |
| 4. | 1.6200 | 36.34 | $R_7=+84.0$ | $T_4=2.50\pm0.07$ |
| | | | $R_8=+16.58$ | $S_3=8.55$ |
| | | | | $S_4=12.386$ |
| 5. | 1.6039 | 38.02 | $R_9=-16.41$ | $T_5=2.00\pm0.07$ |
| | | | $R_{10}=-741.3$ | |
| 6. | 1.6591 | 50.88 | $R_{11}=-741.3$ | $T_6=5.557\pm0.070$ |
| | | | $R_{12}=-22.85$ | $S_5=0.20\pm0.025$ |
| 7. | 1.5891 | 61.24 | $R_{13}=-345.4$ | $T_7=5.50\pm0.10$ |
| | | | $R_{14}=-39.30$ | $S_6=18.057$ |
| 8. | 1.5224 | 59.48 | $R_{15}=\infty$ | $T_8=3.81\pm0.10$ |
| | | | $R_{16}=\infty$ | $S_7=36.50$ to image plane | wherein the respective lens elements are numbered in order from front to rear in the first column, the corresponding refractive indices N for the D line of the spectrum are given in the second column, the corresponding dispersive indices Vare given in the third column, the radii of curvature R of the lens surfaces are given in the fourth column, the respective surfaces being numbered in order from front to rear and being respectively identified by a subscript numeral used with each R, mating cemented surfaces being counted as a single surface in numbering them, plus and minus values of R indicating surfaces which are respectively convex and concave toward the front of the lens, the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 80 millimeters.

2. A microphotographic objective lens for providing reduced microfilm images and comprising eight elements numbered consecutively from object toward the image, front to rear, the first element being a filter, the second element being a first positive meniscus lens, the third element being a second positive meniscus lens, the fourth element being a first negative meniscus lens having a convex surface cemented to the concave surface of said second positive meniscus lens, the fifth element being a second negative meniscus lens, the sixth element being a third positive meniscus lens with a concave surface cemented to the convex surface of said second negative meniscus lens, the seventh element being a fourth positive meniscus lens, and the eighth element being a spaced transparent glass plate, the glass plate being an integral part of the optical system, said lens system having a relative aperture of F./6.0, and wherein the characteristics of said eight elements and their spatial relationship to each other are substantially in the proportions described in the following table:

TABLE II

E.F. 912 mm.

| Element | $N_D$ | V | Radii mm. | Thickness and Spacing mm. |
|---|---|---|---|---|
| 1. | Schott | GG-395 | $R_1=\infty$ | $T_1=4.0\pm0.2$ |
|   |   |   | $R_2=\infty$ |   |
|   |   |   |   | $S_1=2.0\pm1.0$ |
| 2. | 1.5892 | 61.24 | $R_3=+37.2$ | $T_2=6.79\pm0.10$ |
|   |   |   | $R_4=+85.72$ |   |
|   |   |   |   | $S_2=0.230\pm0.025$ |
| 3. | 1.6591 | 50.88 | $R_5=+29.6$ | $T_3=7.92\pm0.07$ |
|   |   |   | $R_6=+95.0$ |   |
| 4. | 1.6200 | 36.34 | $R_7=+95.0$ | $T_4=2.80\pm0.07$ |
|   |   |   | $R_8=+18.75$ |   |
|   |   |   |   | $S_3=9.67$ |
|   |   |   |   | $S_4=14.02$ |
| 5. | 1.6039 | 38.02 | $R_9=-18.61$ | $T_5=2.26\pm0.07$ |
|   |   |   | $R_{10}=-838.2$ |   |
| 6. | 1.6591 | 50.88 | $R_{11}=-838.2$ | $T_6=6.29\pm0.07$ |
|   |   |   | $R_{12}=-25.9$ |   |
|   |   |   |   | $S_5=0.230\pm0.025$ |
| 7. | 1.5892 | 61.24 | $R_{13}=-393.55$ | $T_7=6.20\pm0.10$ |
|   |   |   | $R_{14}=-44.5$ |   |
|   |   |   |   | $S_6=26.49$ |
| 8. | 1.5224 | 59.48 | $R_{15}=\infty$ | $T_8=3.81\pm0.10$ |
|   |   |   | $R_{16}=\infty$ |   |
|   |   |   |   | $S_7=36.5$ to image plane | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by a subscript numeral used with each R, mating cemented surfaces being counted as a single surface in numbering them, plus and minus values of R indicating surfaces which are respectively convex and concave toward the front of the lens, the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 91.2 millimeters.

3. A microphotographic objective lens for providing reduced microfilm images and comprising eight elements numbered consecutively from object toward the image, front to rear, the first element being a filter, the second element being a first positive meniscus lens, the third element being a second positive meniscus lens, the fourth element being a first negative meniscus lens having a convex surface cemented to the concave surface of said second positive meniscus lens, the fifth element being a second negative meniscus lens, the sixth element being a third positive meniscus lens with a concave surface cemented to the convex surface of said second negative meniscus lens, the seventh element being a fourth positive meniscus lens, and the eighth element being a spaced transparent glass plate, the glass plate being an integral part of the optical system, said lens system having a relative aperture of F./6.0, and wherein the characteristics of said eight elements and their spatial relationship to each other are substantially in the proportions described in the following table:

TABLE III

E.F. 115mm.

| Element | $N_D$ | V | Radii mm. | Thickness and Spacing mm. |
|---|---|---|---|---|
| 1. | Schott | GG-395 | $R_1=\infty$ | $T_1=4.0\pm0.2$ |
|   |   |   | $R_2=\infty$ |   |
|   |   |   |   | $S_1=2.0\pm1.0$ |
| 2. | 1.5891 | 61.24 | $R_3=+45.66$ | $T_2=5.500\pm0.10$ |
|   |   |   | $R_4=+103.10$ |   |
|   |   |   |   | $S_2=0.20\pm0.025$ |
| 3. | 1.6591 | 50.88 | $R_5=+39.85$ | $T_3=11.325\pm0.07$ |
|   |   |   | $R_6=+140.0$ |   |
| 4. | 1.6200 | 36.34 | $R_7=+140.0$ | $T_4=3.600\pm0.07$ |
|   |   |   | $R_8=+24.87$ |   |
|   |   |   |   | $S_3=12.07$ |
|   |   |   |   | $S_4=18.757$ |
| 5. | 1.6039 | 38.02 | $R_9=-21.90$ | $T_5=2.800\pm0.07$ |
|   |   |   | $R_{10}=-256.2$ |   |
| 6. | 1.6591 | 50.88 | $R_{11}=-256.2$ | $T_6=7.553\pm0.07$ |
|   |   |   | $R_{12}=-30.90$ |   |
|   |   |   |   | $S_5=0.20\pm0.025$ |
| 7. | 1.5891 | 61.24 | $R_{13}=-370.0$ | $T_7=6.500\pm0.10$ |
|   |   |   | $R_{14}=-53.60$ |   |
|   |   |   |   | $S_6=47.27$ |
| 8. | 1.5224 | 59.48 | $R_{15}=\infty$ | $T_8=3.81\pm0.1$ |
|   |   |   | $R_{16}=\infty$ |   |
|   |   |   |   | $S_7=36.5$ to image plane | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by a subscript numeral used with each R, mating cemented surfaces being counted as a single surface in numbering them, plus and minus values of R indicating surfaces which are respectively convex and concave toward the front of the lens, the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 115 millimeters.

4. A microphotographic objective lens for providing reduced microfilm images and comprising eight elements numbered consecutively from object toward the image, front to rear, the first element being a filter, the second element being a first positive meniscus lens, the third element being a second positive meniscus lens, the fourth element being a first negative meniscus lens having a convex surface cemented to the concave surface of said second positive meniscus lens, the fifth element being a second negative meniscus lens, the sixth element being a third positive meniscus lens with a concave surface cemented to the convex surface of said second negative meniscus lens, the seventh element being a fourth positive meniscus lens, and the eighth element being a spaced transparent glass plate, the glass plate being an integral part of the optical system, said lens system having a relative aperture of F./6.0, and wherein the characteristics of said eight elements and their spatial relationship to each other are substantially in the proportions described in the following table:

TABLE IV

E.F. 125 mm.

| Element | $N_D$  | V     | Radii mm.         | Thickness and Spacing mm. |
|---------|--------|-------|-------------------|---------------------------|
| 1.      | Schott | GG-395| $R_1=\infty$      | $T_1=4.0\pm0.2$           |
|         |        |       | $R_2=\infty$      |                           |
|         |        |       |                   | $S_1=2.0\pm1.0$           |
| 2.      | 1.5892 | 61.24 | $R_3=+48.83$      | $T_2=5.90\pm0.10$         |
|         |        |       | $R_4=+110.60$     |                           |
|         |        |       |                   | $S_2=0.215\pm0.025$       |
| 3.      | 1.6591 | 50.88 | $R_5=+42.75$      | $T_3=12.15\pm0.07$        |
|         |        |       | $R_6=+150.50$     |                           |
| 4.      | 1.6200 | 36.34 | $R_7=+150.50$     | $T_4=3.86\pm0.07$         |
|         |        |       | $R_8=+26.70$      |                           |
|         |        |       |                   | $S_3=12.95$               |
|         |        |       |                   | $S_4=20.13$               |
| 5.      | 1.6039 | 38.02 | $R_9=-23.50$      | $T_5=3.0\pm0.07$          |
|         |        |       | $R_{10}=-275.0$   |                           |
| 6.      | 1.6591 | 50.88 | $R_{11}=-275.0$   | $T_6=8.10\pm0.07$         |
|         |        |       | $R_{12}=-33.18$   |                           |
|         |        |       |                   | $S_5=0.215\pm0.025$       |
| 7.      | 1.5892 | 61.24 | $R_{13}=-398.0$   | $T_7=6.97\pm0.10$         |
|         |        |       | $R_{14}=-57.54$   |                           |
|         |        |       |                   | $S_6=54.11$               |
| 8.      | 1.5224 | 59.48 | $R_{15}=\infty$   | $T_8=3.81\pm0.1$          |
|         |        |       | $R_{16}=\infty$   |                           |
|         |        |       |                   | $S_7=36.5$ to image plane | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by a subscript numeral used with each R, mating cemented surfaces being counted as a single surface in numbering them, plus and minus values of R indicating surfaces which are respectively convex and concave toward the front of the lens, the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 125 millimeters.